United States Patent Office 2,865,879
Patented Dec. 23, 1958

2,865,879

COMBINED ACETONITRILE AND AROMATIC HYDROCARBON SOLVENT SOLUTION OF A VINYL CHLORIDE-VINYL ACETATE COPOLYMER

Gerald P. Roeser, Fallsington, Pa., assignor, by mesne assignments, to American-Marietta Company, Stoner-Mudge Co. Division, Chicago, Ill., a corporation of Illinois No Drawing. Application February 9, 1956
Serial No. 564,376

10 Claims. (Cl. 260—32.4)

This invention relates to the use of acetonitrile in conjunction with aromatic hydrocarbon solvents to dissolve certain resins, especially copolymers of vinyl chloride and vinyl acetate.

Vinyl polymers and copolymers have become well known in many industries for their valuable properties, and one phase of their development has been a search for suitable solvents to form solutions of the polymers for various purposes, such as protective coatings, films, and various other plastic applications. There are a number of active solvents which have been found to be generally suitable for such purposes, such as isophorone, cyclohexanone and methyl ethyl ketone. Such active solvents are expensive, however, and consequently attempts have been made to find less expensive substitutes. The common aromatic hydrocarbon solvents are much less expensive, but they can be used only as diluents with more active solvents to dissolve most vinyl polymers and copolymers, with rare exceptions; e. g., straight aromatic hydrocarbon solvents with vinyl chloride/vinylidene chloride copolymers as disclosed in Gray and Reymann U. S. Patent 2,675,334. In the case of copolymers of vinyl chloride and vinyl acetate, which are among the most widely accepted and useful of the vinyl compounds, particularly in the protective coating field, it is necessary to use expensive active solvents, either exclusively or in relatively large proportions with aromatic hydrocarbon solvents, in order to dissolve the vinyl chloride/vinyl acetate copolymers sufficiently to obtain the desired viscosity. The resultant expense and other difficulties have led to a long continued search for other solvent materials which could be used in smaller proportions with aromatic hydrocarbon solvents for obtaining suitable solutions of vinyl chloride/vinyl acetate copolymers.

I have discovered that there is a synergistic relation between acetonitrile ($CH_3CN$) and liquid aromatic hydrocarbons such as benzene, toluene and xylene, and mixtures thereof, whereby the combination of the two is highly effective when used with certain resins, particularly copolymers of vinyl chloride and vinyl acetate containing less than 90% by weight of vinyl chloride. There is evidently a special relation between the acetonitrile component of the solvent system and the aromatic hydrocarbon component, because neither one of the components used alone is capable of dissolving these resins, but the combination of the two components is highly effective in dissolving them. The combination is particularly valuable because of its usefulness as a solvent for vinyl chloride/vinyl acetate copolymers, which are of major commercial importance, and because a very high percentage of the aromatic hydrocarbon component, which is relatively inexpensive, can be used in the solvent mixture for purposes of dissolving vinyl chloride/vinyl acetate copolymers, in spite of the fact that such copolymers are noted for their resistance to dissolution in conventional solvent mixtures containing like percentages of such aromatic hydrocarbon component.

The solvent composition of the invention consists of the combination of acetonitrile with benzene, toluene or xylene, or mixtures thereof. Xylene is less effective in the combination than either benzene or toluene, and where xylene is present the minimum effective proportion of acetonitrile increases slightly, but the maximum effective proportion remains the same. Toluene is preferred because it has the best solvent action in conjunction with acetonitrile, and because it does not have the toxic characteristics of benzene. When used as a solvent for copolymers of vinyl chloride and vinyl acetate containing about 87% by weight of vinyl chloride, the composition of the invention is effective in a range of proportions by weight of acetonitrile (the balance being benzene, toluene or xylene, or mixtures thereof) between and including a maximum of substantially 65%, and a minimum of substantially 5% plus, only in the case when xylene is present, an additional 2.5% multiplied by a factor equal to the weight of the xylene divided by the total weight of (1) xylene, or (2) benzene and xylene, or (3) benzene and toluene, or (4) benzene, toluene and xylene, as the case may be, which are present in the combination. As the proportion of vinyl chloride in the copolymer is decreased below 87% the greater solvency of the vinyl acetate in the copolymer makes the composition of the invention effective as a solvent for the copolymer with a progressively smaller minimum and larger maximum proportion of acetonitrile.

The following Table I shows the effectiveness of acetonitrile as compared with methyl ethyl ketone and tetrahydrofuran when used in various proportions with toluene, in terms of viscosities (in seconds at 80° F. with #4 Ford cup) of compositions consisting of uniform samples of vinyl chloride/vinyl acetate copolymer (87/13 ratio, "VYHH") at 18% solids by weight in the various solvent mixtures (component ratios by weight):

*Table I.—Comparative viscosities*

[Seconds at 80° F. with a #4 Ford cup]

| Ratio of components in solvent | Solvent Combination | | |
|---|---|---|---|
| | (1) (methyl ethyl ketone and toluene) | (2) (tetrahydrofuran and toluene) | (3) (acetonitrile and toluene) |
| 100/0 | 19 | 24 | Swollen. |
| 95/5 | 19 | 22 | Do. |
| 75/25 | 20 | 23 | Do. |
| 70/30 | 20 | 24 | Do. |
| 65/35 | 20 | 25 | 27. |
| 60/40 | 21 | 25 | 25. |
| 55/45 | 21 | 26 | 23. |
| 50/50 | 21 | 27 | 22. |
| 33/67 | 26 | 41 | 22. |
| 25/75 | 27 | 61 | 24. |
| 15/85 | 43 | Insoluble | 29. |
| 10/90 | 109 | do | 34. |
| 9/91 | Gel | do | 43. |
| 7.5/92.5 | do | do | 47. |
| 5/95 | do | do | 65. |
| 4/96 | do | do | Gel. |
| 0/100 | do | do | Do. |

It is particularly significant to note in the above Table I that when the solvent mixture has more than 50% toluene in the solvent mixture, acetonitrile is far more effective in the solvent mixture than conventional strong solvents such as methyl ethyl ketone and tetrahydrofuran.

The following Table II shows the effect of using various aromatic hydrocarbon components in various proportions with acetonitrile, in terms of viscosity (in seconds at 80° F. with #4 Ford cup) of compositions consisting of uniform samples of vinyl chloride/vinyl acetate copolymer (87/13 ratio, "VYHH") at 18% solids by weight in the various solvent mixtures:

*Table II.—Comparative viscosities when using acetonitrile with different aromatic hydrocarbons*

[Seconds at 80° F. with a #4 Ford cup]

| Ratio of acetonitrile to the aromatic hydrocarbon specified in adjacent headings (by weight) | Solvent combination of acetonitrile with— | | | | |
|---|---|---|---|---|---|
| | Benzene | Toluene | Xylene | Solvesso #100 | Solvesso #150 |
| 100/0 | Swollen | Swollen | Swollen | Swollen | Swollen. |
| 95/5 | do | do | do | do | Do. |
| 75/25 | do | do | do | do | Do. |
| 50/50 | 23 | 22 | 22 | 28 | 29. |
| 33/67 | 24 | 22 | 22 | 30 | 42. |
| 25/75 | 25 | 24 | 25 | 36 | 45. |
| 15/85 | 31 | 29 | 29 | 52 | 76. |
| 10/90 | 38 | 34 | 39 | 77 | 144. |
| 9/91 | 44 | 43 | 56 | 79 | Gel. |
| 7.5/92.5 | 52 | 47 | 101 | Gel | Insol. |
| 5/95 | 84 | 65 | Insol | Gel | Insol. |
| 4/96 | Gel | Gel | Insol | Insol | Insol. |
| 0/100 | Insol | Insol | Insol | Insol | Insol. |

In the above Table II, "Solvesso #100" and "Solvesso #150" are commercial mixed aromatic hydrocarbon solvents. When commercial naphthene spirits, such as "Troluoil" and "Apco Thinner," or aliphatic hydrocarbons, such as "Stodsol," are used with acetonitrile in any proportions as a solvent for the same copolymer, the results are total insolubility or close to it.

The following Table III shows the effectiveness of acetonitrile and toluene with various kinds of vinyl resins, in terms of comparative viscosities (in seconds at 80° F. with #4 Ford cup) when using acetonitrile and toluene separately and in various combined proportions, with the resins:

*Table III.—Comparative viscosities with different resins*

[Seconds at 80° F. wtih a #4 Ford cup]

| Resin | Percent Total Solids | Ratio acetonitrile/toluene (by weight) | | | | |
|---|---|---|---|---|---|---|
| | | 100/0 | 65/35 | 50/50 | 5/95 | 0/100 |
| "VYHH" | 18 | Insol | 27 | 22 | 65 | Insol. |
| "VYLF" | 20 | Insol | 33 | 21 | 90 | Insol. |
| "VMCH" | 18 | Insol | 34 | 26 | Gel | Insol. |
| "VAGH" | 18 | Insol | Gel | 39 | Swollen | Insol. |
| "VYNS" | 15 | Insol | Swollen | Gel | do | Insol. |

Supplementing the above Table III, the viscosity readings for "VMCH" are 34 and 39 seconds at acetonitrile/toluene ratio of 20/80 and 10/90, respectively, and for "VAGH" are 43, 37, 40, 44 and 71 seconds at acetonitrile/toluene ratios of 61.5/38.5, 57.5/42.5, 25/75, 20/80 and 15/85, respectively.

In the above Table III, "VYHH" and "VYLF" are copolymers of vinyl chloride and vinyl acetate in proportions of 87/13 by weight, the difference between the two lying in the fact that "VYHH" has a higher molecular weight, "VMCH" is a copolymer of vinyl chloride, vinyl acetate and maleic anhydride, in proportions by weight of 86/13/1. "VAGH" is a partially hydrolyzed copolymer of vinyl chloride and vinyl acetate, the copolymer being originally like "VYHH," but changed by hydrolysis to proportions by weight of 6% vinyl alcohol, 3% vinyl acetate and 91% vinyl chloride. "VYNS" is a copolymer of vinyl chloride and vinyl acetate in proportions by weight of 90/10.

The mixed solvent of the invention is effective with copolymers of vinyl chloride and vinyl acetate containing less than 90% by weight of vinyl chloride. There is no upper limit on the amount of vinyl acetate in the copolymer because the vinyl acetate component is relatively easily dissolved. For example, 100% vinyl acetate polymer dissolves in 100% toluene, and in any mixture of toluene with acetonitrile containing not more than 95% acetonitrile.

Compositions employing the polymer and solvent combination of the invention are useful for protective coating and other purposes for which vinyl chloride/vinyl acetate solutions are used. For example, a composition of the above-described "VYHH" vinyl chloride/vinyl acetate copolymer at 21% applied solids in solvent consisting of 67% toluene and 33% acetonitrile was filmed on tinplate at 4.7 m. g./sq. in and baked thereon at 325° F. for ten minutes. The coating was tested for color, clarity, flow, adhesion, insolubility, flexibility, and, after pasteurization at 170° F. for 45 minutes, for blush, blistering, spotting and wet adhesion. For purposes of comparison, a composition of the same copolymer at 19.5% applied solids in solvent consisting of 67% toluene and 33% methyl ethyl ketone was filmed on like specimens at 5.3 mg./sq. in. and then baked and tested as stated above. The results were the same in both cases, showing that coating qualities are not adversely affected by substitution of acetonitrile for such standard solvents as methyl ethyl ketone in coating compositions of vinyl chloride/vinyl acetate copolymers. The composition of the invention can have a viscosity range of 20 to 150 seconds in #4 Ford cup at 80° F., and a solids concentration of vinyl chloride/vinyl acetate copolymer of up to about 21% by weight, for most protective coating purposes, but these ranges can be exceeded for some protective coating purposes.

Pigments, dyes, waxes and other non-reactants may be added to the composition of the invention for decorative purposes and the like, without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. A resin composition comprising a copolymer of vinyl chloride and vinyl acetate containing a major proportion by weight of vinyl chloride, said copolymer being dissolved in a solvent composition consisting essentially of acetonitrile and liquid aromatic hydrocarbon solvent, said acetonitrile being present in said mixture of acetonitrile and liquid aromatic hydrocarbon solvent in proportions of from substantially 5% to 65% by weight.

2. A resin composition as recited in claim 1 in which the proportion of vinyl chloride in said copolymer comprising vinyl chloride and vinyl acetate is about 87% by weight.

3. A resin composition as recited in claim 2 in which said liquid aromatic hydrocarbon solvent includes a proportion of xylene and said acetonitrile solvent is present in said mixture of liquid aromatic hydrocarbon solvent and acetonitrile in a minimum proportion by weight of substantially 5%, plus 2.5% multiplied by a fraction equal to the weight of xylene present, divided by the total weight of liquid aromatic hydrocarbon solvent, the maximum proportion of said acetonitrile solvent in said mixture of liquid aromatic hydrocarbon solvent and acetonitrile being 65% by weight.

4. A resin composition as recited in claim 2 in which said liquid aromatic hydrocarbon solvent is selected from the group consisting of benzene, toluene, xylene and mixtures thereof, the minimum proportion of said acetonitrile component by weight based on the total weight of liquid aromatic hydrocarbon solvent and acetonitrile being substantially 5% plus 2.5% multiplied by a fraction equal to the weight of xylene present, divided by the total weight of liquid aromatic hydrocarbon solvent, the maximum proportion of said acetonitrile solvent in said mixture of liquid aromatic hydrocarbon solvent and acetonitrile being 65% by weight.

5. A resin composition comprising a copolymer of vinyl chloride and vinyl acetate containing about 87% by weight of vinyl chloride, said copolymer being dissolved in a solvent composition consisting essentially of acetonitrile and toluene, said acetonitrile being present in said mixture of acetonitrile and toluene in proportions of from substantially 5% to 65% by weight.

6. A resin composition as recited in claim 5 in which the percentage of acetonitrile is substantially 5%.

7. A resin composition comprising a copolymer of vinyl chloride and vinyl acetate containing about 87% by weight of vinyl chloride, said copolymer being dissolved in a solvent composition consisting essentially of acetonitrile and benzene, said acetonitrile being present in said mixture of acetonitrile and benzene in proportions of from substantially 5% to 65% by weight.

8. A resin composition as recited in claim 7 in which the percentage of acetonitrile is substantially 5%.

9. A resin composition comprising a copolymer of vinyl chloride and vinyl acetate containing about 87% by weight of vinyl chloride, said copolymer being dissolved in a solvent composition consisting essentially of acetonitrile and xylene, said acetonitrile being present in said mixture of acetonitrile and xylene in proportions of from substantially 7.5% to 65% by weight.

10. A resin composition as recited in claim 9 in which the percentage of acetonitrile is substantially 7.5%.

References Cited in the file of this patent
UNITED STATES PATENTS
2,706,185     Kowolik et al. _____ Apr. 12, 1955